US007401392B1

(12) United States Patent
Ramsey

(10) Patent No.: US 7,401,392 B1
(45) Date of Patent: Jul. 22, 2008

(54) JACK FOR SINGLE-HANDED GARBAGE DISPOSER INSTALLATION

(75) Inventor: Kent D. Ramsey, South Bend, IN (US)

(73) Assignee: Innoplumb LLP, South Bend, IN (US)

( * ) Notice: Subject to any disclaimer, the term of this patent is extended or adjusted under 35 U.S.C. 154(b) by 0 days.

(21) Appl. No.: 11/713,236

(22) Filed: Mar. 2, 2007

(51) Int. Cl.
*B23P 19/04* (2006.01)
*B23P 17/00* (2006.01)

(52) U.S. Cl. ........................ 29/252; 29/281.1; 254/2 B; 254/98

(58) Field of Classification Search .................. 29/252, 29/281.1, 266; 254/2 B, 133 R, 134, 98, 254/100, DIG. 1, 9 B
See application file for complete search history.

(56) References Cited

U.S. PATENT DOCUMENTS 2,946,525 A 7/1960 Thierer
5,379,974 A * 1/1995 Slay et al. .................. 248/161
5,711,512 A * 1/1998 Kauffman .................. 254/2 B
5,915,672 A * 6/1999 Dickey .................. 254/133 R
6,089,545 A * 7/2000 Norman et al. ............. 254/134
6,142,460 A * 11/2000 Irwin .......................... 269/60
6,145,813 A * 11/2000 Anderson .................. 254/418
6,199,826 B1 * 3/2001 Nix ............................ 254/8 B
6,220,573 B1 * 4/2001 Bromberek ............. 254/133 A
6,416,039 B1 * 7/2002 Pietrusynski ................ 254/8 B
2002/0171189 A1 11/2002 Griggs

* cited by examiner

*Primary Examiner*—Lee D Wilson
(74) *Attorney, Agent, or Firm*—William S. Ramsey

(57) ABSTRACT

An exemplary embodiment provides one or more improvements which makes it possible for a single person to easily install a garbage disposal under a sink. Embodiments include a base with wheels, a hydraulic jack attached to the base, an extensible column extended by the hydraulic jack, and a platform attached to the extensible column. The garbage disposer is placed on the platform and the installation tool is moved under the sink, the jack is used to raise and support the platform and the garbage disposal in position for attachment to the sink.

2 Claims, 4 Drawing Sheets

JACK FOR SINGLE-HANDED GARBAGE DISPOSER INSTALLATION

CROSS-REFERENCE(S)

Not Applicable.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND

Embodiments relate to tools enabling a single person to install a garbage disposer.

DESCRIPTION OF RELATED ART INCLUDING INFORMATION DISCLOSED UNDER 37 CFR 1.97 AND 37 CFR 1.98.

U.S. Pat. No. 2,946,525 discloses a quick connect sink mounting for garbage grinders in which the grinder is attached to the bottom of the sink using a mounting ring with key-holes which interact with jack screws to secure the grinder.

U.S. Pat. No. 6,142,460 discloses an apparatus which uses thumbscrew secured telescopic tubes and a screw arrangement to hold and raise a garbage disposer for installation on the bottom of a sink.

U.S. Pat. No. 6,220,573 discloses a jack mounted on a wheeled platform for hoisting a vehicular clutch.

U.S. Pat. Applic. Pub. No. US2002/0171189 discloses a cabinet installation device involving an hydraulic pump mounted on a base and bearing a support plate.

The foregoing examples of the related art and limitations related therewith are intended to be illustrative and not exclusive. Other limitations of the related art will become apparent to those of skill in the art upon a reading of the specification and a study of the drawings.

BRIEF SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Embodiments enable a single person to install a garbage disposer, a process which conventionally requires two persons. The use of a jack to raise the garbage disposer removes the requirement for substantial manual strength to raise the disposer into position for attachment to the sink. This requirement is particularly arduous because garbage disposers often must be installed in finished cabinets build around the sink. Conventional procedures require one person to raise and hold the garbage disposer in position at the bottom of the sink. The other person is required to orient the disposer with respect to the waste line in and to manipulate the disposer attaching ring which connects the garbage disposer to the sink. Embodiments substitute the installation tool for the efforts of the first person in raising the garbage disposer and holding it in position for attachment to the sink.

In addition, embodiments include an accommodating connector between the jack and platform. The accommodating connector allows a certain degree of deviation of the platform from a perpendicular relationship with the extensible column of the jack. This deflation facilitates the installation of a garbage disposal in the nearly universal case where the kitchen floor or the disposal cabinet floor is not parallel with the bottom of the sink.

Embodiments include a garbage disposer installation tool comprising a base having a top side and a bottom side and friction reduction means attached to the bottom side. Jack means are attached to the top side of the base, the jack means having an extensible column. A support plate is attached at the upper end of the extensible column. The support platform is attached to the extensible column through an accommodating connector.

Embodiments also include the process of installing a garbage disposer on a sink by a single operator which comprises the following steps. The garbage disposer is placed on the platform of a garbage disposer installation tool. The tool is inserted below the sink. The garbage disposer installation tool or the garbage disposer is rotated so the disposer discharge outlet is oriented with respect to the kitchen waste pipe. The tool platform is raised using a jack. This brings the garbage disposer opening into proximity with the sink drain and holds it in position. The garbage disposer then is attached to the sink drain. Finally, the garbage disposer discharge outlet is attached to the kitchen waste pipe.

Embodiments also include the process when the sink has a mounting ring with tracks and ridges attached to a flange at the bottom of the sink drain. The garbage disposer has an attaching ring with mounting tabs attached at the top of the garbage disposal. The attachment process comprises the following steps. The mounting tabs of the attaching ring are placed in position to slide over the tracks and ridges on the mounting ring. The attaching ring is rotated with respect to the mounting ring until the mounting tabs of the attaching ring pass over the ridges of the mounting ring, thereby removable attaching the garbage disposer and the sink.

In addition to the exemplary aspects and embodiments described above, further aspects and embodiments will become apparent by reference to the drawings and by study of the following descriptions.

DETAILED DESCRIPTION

Figure 1:
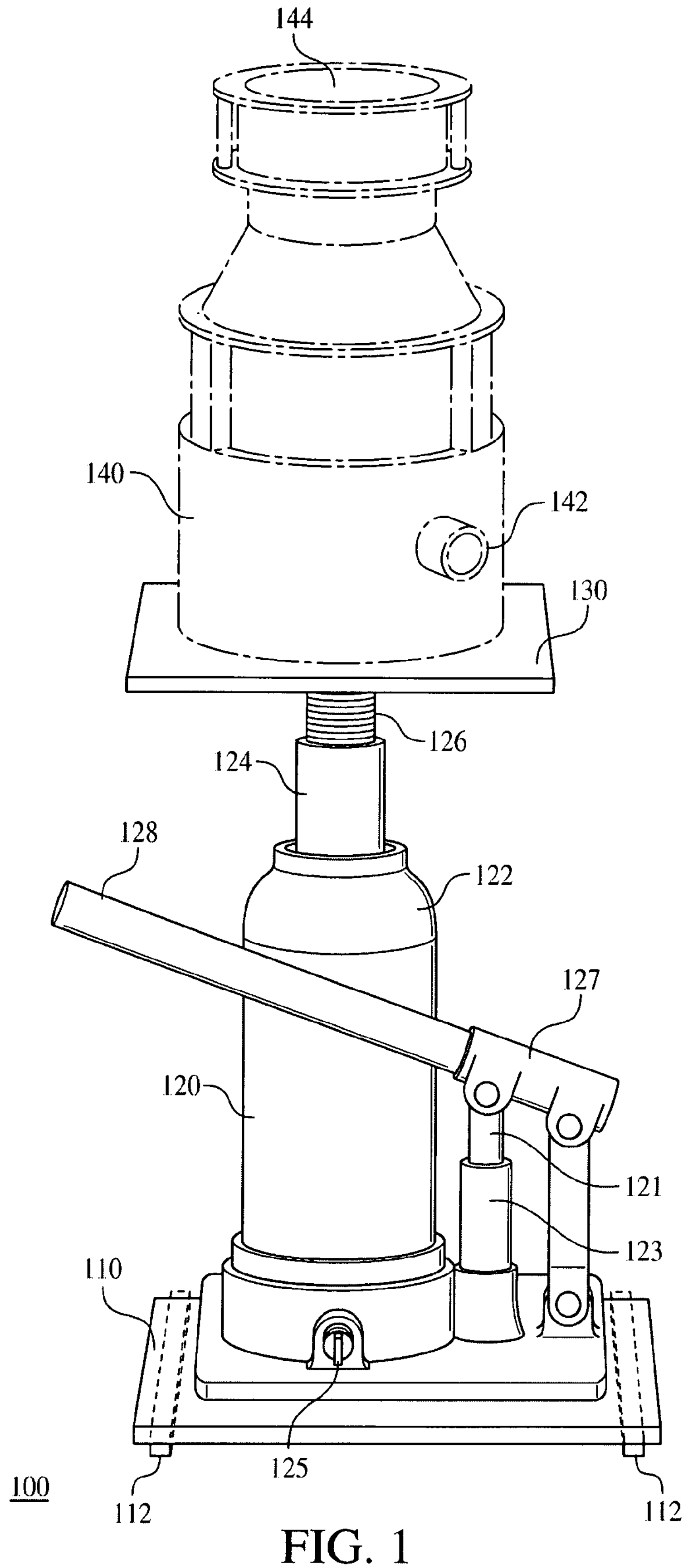
FIG. 1 is a perspective view of the first embodiment tool with a garbage disposer shown in dashed line.

FIG. 1 is a perspective view of the first embodiment tool 100 with a garbage disposer shown in dashed line. An approximately square base 110 is at the bottom of the tool. Friction reducing means in the form of anti-friction strips 112 are attached at the bottom of the base. The base is attached to the bottom of the hydraulic jack 120.

Jack means in the form of a hydraulic jack 120, also called a bottle jack, is comprised of a large hydraulic cylinder 122, which contains an extensible column 124. An optional screw column attachment 126 is at the top of the extensible column 124. Also visible in FIG. 1 is a small hydraulic cylinder 123, a piston 121 which interacts with the small hydraulic cylinder, and a socket 127 which receives a handle 125. Reciprocal movement of the handle causes the pumping of hydraulic fluid from the small hydraulic cylinder 123 into the large hydraulic cylinder 122 with the extension of the extensible column 124. A release valve 125 is used to release the hydraulic fluid from the large hydraulic cylinder with the retraction of the extensible column.

An approximately square platform 130 is attached at the upper end of the extensible column 124, or to the top of the screw column attachment 126 if this element is present. If the screw column attachment 126 is not included, the platform 130 is attached to the top of the extensible column 124. The garbage disposer 140 is depicted in dashed lines in FIG. 1. Also shown are the garbage disposer discharge outlet 142 and the garbage disposer inlet 144.

Figure 2:
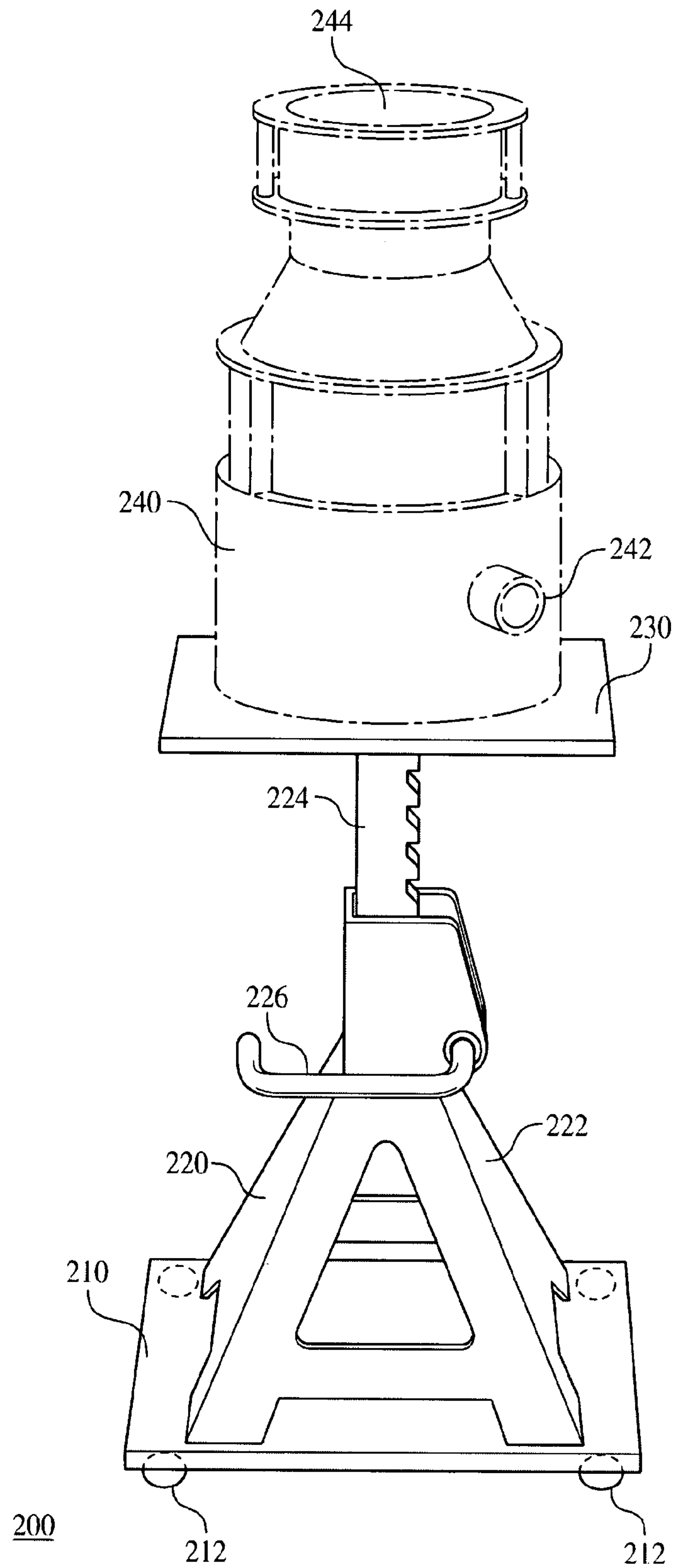
FIG. 2 is a perspective view of the second embodiment tool with a garbage disposer shown in dashed line.

FIG. 2 is a perspective view of the second embodiment tool 200 with a garbage disposer shown in dashed line. The second embodiment differs from the first embodiment in that the second embodiment uses a jack stand rather than a hydraulic jack to raise the garbage disposer.

FIG. 2 shows an approximately square base 210. Friction reducing means in the form of at least 3 hemispheric domes 212 are on the bottom of the base. The base is attached to the bottom of the ratchet jack stand 220.

Jack means in the form of a ratchet jack stand 220 is comprised of a jack stand body 222 which contains a ratchet mechanism activated by a ratchet handle 226. The ratchet mechanism is used to extend an extensible column 224. When the ratchet handle 226 is moved into the extreme up position the ratchet mechanism is released, allowing the extendible column to retract into the jack stand body 222.

An approximately square platform 230 is attached to the end of the extensible column 224. The garbage disposer 240 is depicted in dashed lines in FIG. 2. Also shown are the garbage disposer discharge outlet 242 and the garbage disposer inlet 244.

Figure 3:
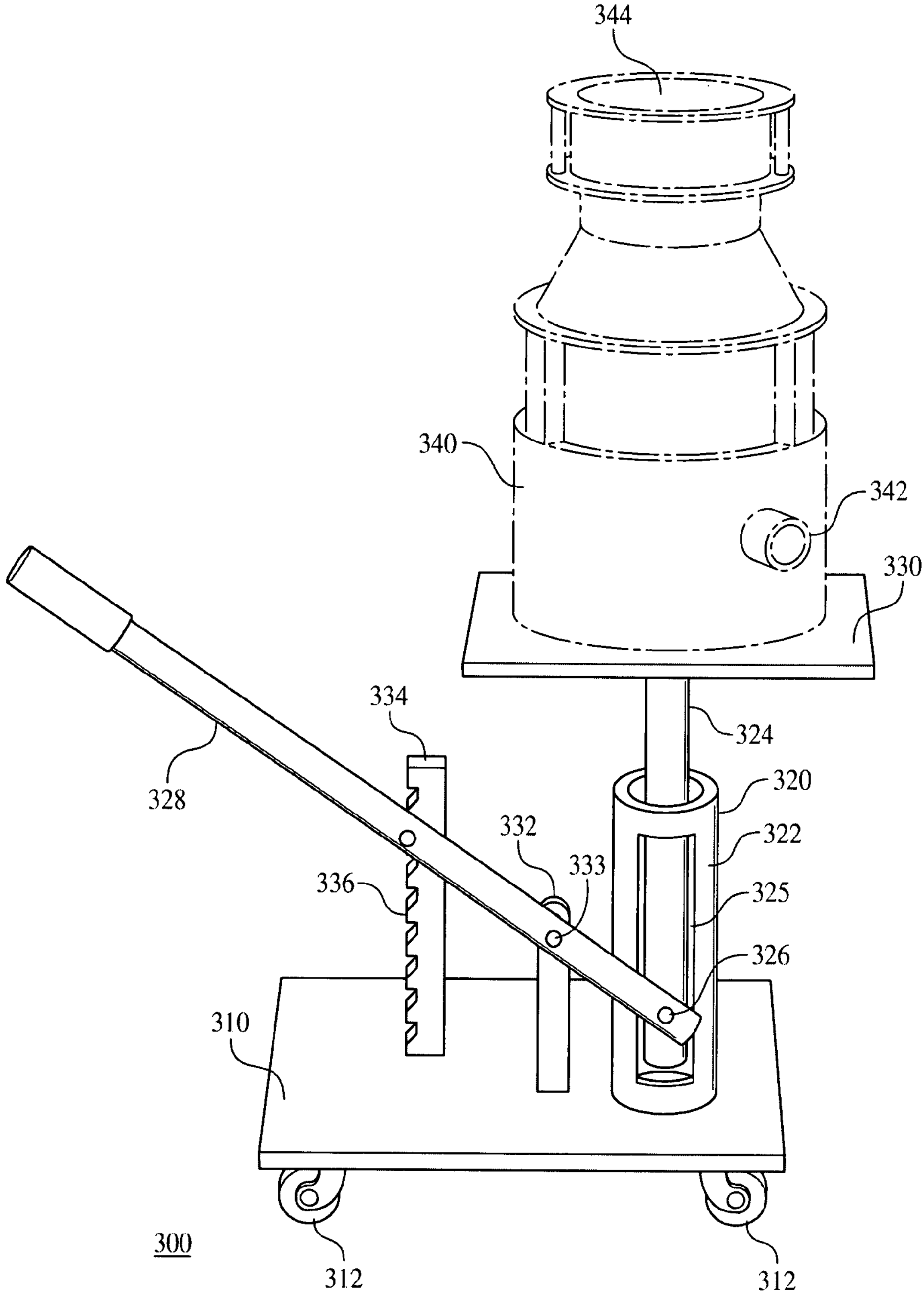
FIG. 3 is a perspective view of the third embodiment tool with a garbage disposer shown in dashed line.

FIG. 3 is a perspective view of the third embodiment tool 300 with a garbage disposer shown in dashed line. The third embodiment differs from the first embodiment in that the third embodiment uses a lever jack rather than a hydraulic jack to raise the garbage disposer.

FIG. 3 is a perspective view of the third embodiment tool 300 with a garbage disposer shown in dashed line. An approximately rectangular base 310 is at the bottom of the tool. Friction reducing means in the form of at least 3 wheels 312 are attached at the bottom of the base. The base is attached to the bottom of the lever jack 320.

Jack means in the form of a lever jack 320, is comprised of a cylinder 322, which contains an extensible column 324 visible through a slot 325 in the cylinder 322. A lever 328 is pivotally mounted to a fulcrum 332 by a bolt 333. The lever 328 extends through the slot 325 and is pivotally mounted to extensible column 324 by bolt 326. A locking bar 334 is vertically mounted on the base 310. Reciprocal movement of the 328 causes the raising or lowering of the extensible column 324 A locking bar 334 has teeth 336 which interact with the lever 328 to hold the lever in a desired position An approximately square platform 330 is attached at the upper end of the extensible column 324. The garbage disposer 340 is depicted in dashed lines in FIG. 3. Also shown are the garbage disposer discharge outlet 342 and the garbage disposer inlet 344.

Each embodiment tool includes an embodiment of an accommodating connector between the extensible column and the platform. Accommodating connectors allow the top of the platform to deviate reversible from approximately 0° to 30° from a perpendicular relationship with the extensible column. Such deviation is necessary in virtually all garbage disposal installations because the kitchen or cabinet floor is not parallel with the bottom of the sink. In the absence of an accommodating connector the garbage disposal would be elevated by the tool to the sink at an angle which would make connecting the disposal to the sink difficult.

Figure 4A:
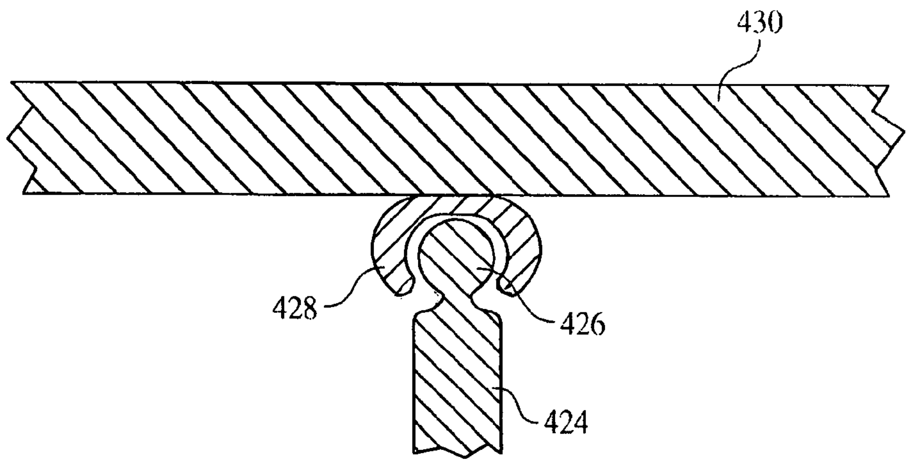
FIG. 4A is a cross section view of the first embodiment accommodating connection between the jack extensible column and platform.

FIG. 4A is a cross section view of the first embodiment accommodating connection between the jack extensible column and platform. Visible in FIG. 4A is the extensible column 424 with a ball 426 attached to the top of the column. The ball is enclosed by a collar 428 which is attached to the bottom on the platform 430. This accommodating connection allows the lateral inclination of the platform to accommodate the lack of parallelism between the kitchen or cabinet floor and sink bottom found in virtually all cases. Of course, the accommodating connection also is effective when there is parallelism between the kitchen or cabinet floor and bottom of the sink. The accommodating connection also allows the rotation of the platform with respect to the base often necessary to align the garbage disposal in making connection with the outlet.

Figure 4B:
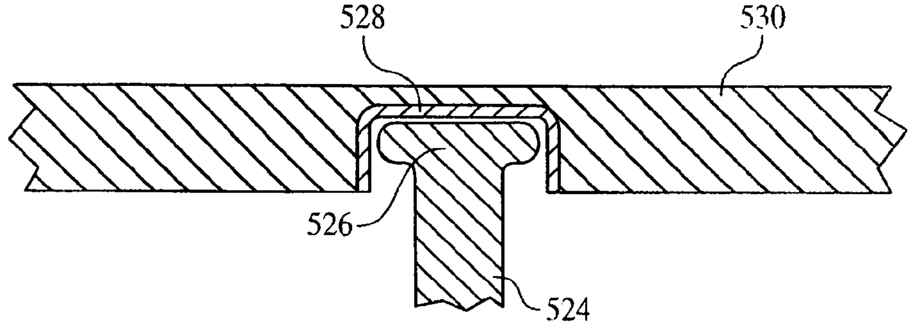
FIG. 4B is a cross section view of the second embodiment accommodating connection between the jack extensible column and platform.

FIG. 4B is a cross section view of the second embodiment accommodating connection between the jack extensible column and platform. Visible in FIG. 4B is the extensible column 524 with a head 528 attached to the top of the column. The head is enclosed by a cylindrical cup 528 which is inserted into a cavity in the platform 530. The second embodiment accommodating connection has the same functions as the first embodiment accommodating connection. In addition, in the second embodiment, the platform 530 is easily removed from the extensible column 524 allowing the use of the jack for other purposes.

Figure 4C:
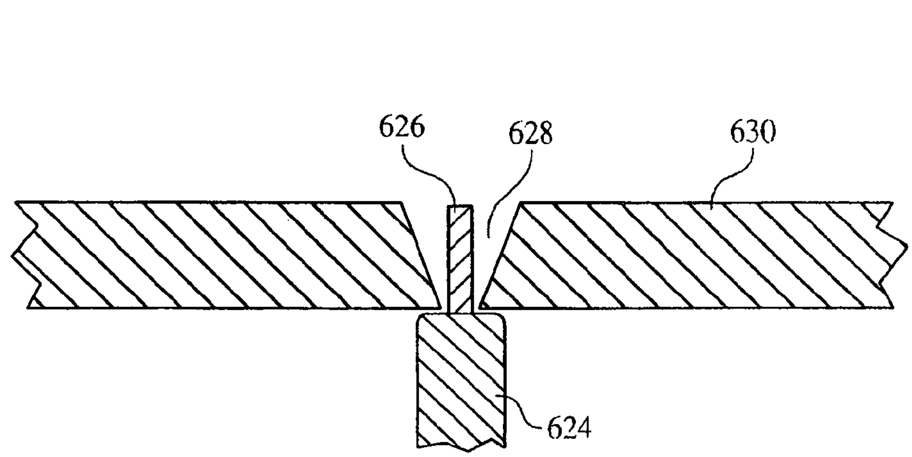
FIG. 4C is a cross section view of the third embodiment accommodating connection between the jack extensible column and platform.

FIG. 4C is a cross section view of the third embodiment accommodating connection between the jack extensible column and platform. Visible in FIG. 4C is the jack extensible column 624 with a spike 628 attached to the top of the column. The spike 626 is inserted into a conical hole 628 through the platform 630. The second embodiment accommodating connection has the same functions as the first embodiment accommodating connection. In addition, in the second embodiment, the platform 630 is easily removed from the extensible column 624 allowing the use of the jack for other purposes.

Any embodiment accommodating connection may be used with any embodiment tool.

The shape of the bases and platforms are not crucial to the embodiments. Other shapes, such as approximately round or oval are contemplated.

While three friction reduction means are disclosed in FIGS. 1, 2, and 3 other equivalent friction reduction means which facilitate the movement of the base over the floor or cabinet floor below a sink are contemplated. Other friction reduction means include rollers, and embossed corrugations on the bottom of the bases.

The first, second and third embodiments disclose the use of hydraulic jacks and ratchet jack stands and lever jacks. Other equivalent jack mechanisms which allow the controlled, convenient, and low-effort raising and lowering of a garbage disposer are contemplated. Other jack means include ratchet jacks, screw jacks, ratchet/screw journal jacks. Other means for activating a jack, such as electrical, hydraulic, or air pressure mechanisms are contemplated.

A typical residential sink has the outlet approximately 29 inches above the floor. In addition, there typically is a cabinet built around the sink, often with a cabinet floor which may be some 6 inches above the kitchen floor. A typical garbage disposer has a roughly cylindrical shape with a height of about 11 inches and a diameter of about 6 inches. Institutional food service installations typically are larger.

A typical garbage disposer weighs from about 15 to about 30 pounds. It is very difficult for a single person to both hold the disposer in place against the sink drain and manipulate the attachment mechanism.

In use, the extensible column of embodiments of the tool is retracted to the lowest position and the garbage disposer is placed on the platform. If the tool is equipped with a screw column attachment, the platform is rotated to raise the platform somewhat so the inlet of the garbage disposal will be a few inches below the sink when the too is in position under the sink. The tool with the garbage disposer is then placed in the cabinet beneath the sink or on the floor beneath the sink if there is no cabinet. The friction reduction means on the bottom of the base facilitates the movement of the tool into position with the garbage disposer inlet directly below the sink drain. The tool is then rotated as necessary to orient the garbage disposer discharge outlet with regard to the kitchen waste pipe. The tool is raised using the pump means until the garbage disposer inlet is adjacent to the sink drain. The garbage disposer is attached to the sink drain and the garbage disposer outlet is connected to the kitchen waste line. The extensible column of the tool is retracted until the retaining means is below the bottom of the garbage disposer and the tool is removed from under the sink.

There are a number of devices for attachment of a garbage disposer to a sink. Embodiments are capable of use with any attachment mechanism. One popular attachment mechanism involves a mounting ring on the sink which interacts with an attaching ring on the garbage disposer. The mounting ring is secured in place to the flange at the bottom of the sink drain by a ring. The mounting ring has three or more tab-like tracks which have ridges arrayed about the circumference of the mounting ring. The attaching ring at the inlet of the garbage disposer has three or more mounting tabs about its circumference. In attaching the garbage disposer to the sink, the mounting ring tracks are placed near the attaching ring mounting tabs and the attaching ring is rotated, causing the mounting tabs to move over the mounting ring tracks and over the ridges. This reversibly locks the garbage disposer to the sink flange.

The elements of the garbage disposer tool are constructed of strong, durable materials, such as steel, iron, aluminum, plastic. A suitable material for antifriction strips is amorphous fluoropolymer resin, for example, the resin sold as TEFLON AF, a trademark for amorphous fluoropolymer resin owned by E.I. duPont de Nemours and Company, Wilmington, Del.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

I claim:

1. A garbage disposer installation tool comprising:

a substantially rectangular base having a top side and a bottom side, wheels attached to the bottom side of the base, a lever jack stand attached to the top side of the base, the lever jack comprising a cylinder with a slot attached to the top side of the base, an extensible column contained in the cylinder, a lever for extending the extensible column when moved in a reciprocating manner, the lever pivotally attached at one end to the extensible column and pivotally attached to a fulcrum, and a locking bar with teeth which retain the lever in any desired position, and a platform, the platform reversibly attached to the extensible column by an accommodating connection comprising a spike attached to the top of the extensible column which interacts with a conical hole in the platform.

2. The tool of claim 1 having at least 3 wheels.

* * * * *